US009418231B2

(12) United States Patent
Kruglick (10) Patent No.: US 9,418,231 B2
(45) Date of Patent: Aug. 16, 2016

(54) PERTURBATION OF FIELD PROGRAMMABLE GATE ARRAY CODE TO PREVENT SIDE CHANNEL ATTACK (71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 239 days.

(21) Appl. No.: 14/295,286

(22) Filed: Jun. 3, 2014

(65) Prior Publication Data

US 2015/0347760 A1    Dec. 3, 2015

(51) Int. Cl.
*G06F 21/57* (2013.01)
*G06F 21/50* (2013.01)
*G06F 21/76* (2013.01)
*G06F 21/70* (2013.01)

(52) U.S. Cl.
CPC .............. *G06F 21/577* (2013.01); *G06F 21/50* (2013.01); *G06F 21/57* (2013.01); *G06F 21/572* (2013.01); *G06F 21/70* (2013.01); *G06F 21/76* (2013.01)

(58) Field of Classification Search
CPC ....... G06F 21/50; G06F 21/57; G06F 21/572; G06F 21/577; G06F 21/70; G06F 21/76
See application file for complete search history.

(56) References Cited

U.S. PATENT DOCUMENTS 7,924,057 B2   4/2011  Verbauwhede et al.
8,006,058 B2   8/2011  Benoit
8,341,758 B2   12/2012 Kim et al.

OTHER PUBLICATIONS

"Catalyst SSL Services Module Deployment in the Data Center with Back-End Encryption," Technical white paper, Chapter 6, accessed at http://www.cisco.com/en/US/docs/solutions/Enterprise/Data_Center/ServerFarmSec_2.1/6_SSLSM.pdf, accessed on Jun. 2, 2014, pp. 1-72.
"Combinational Logic Circuits," accessed at http://web.archive.org/web/20140330183604/http://www.electronics-tutorials.ws/combination/comb_1.html, accessed on Jun. 2, 2014, pp. 1-9.
"De Morgan's laws," Wikipedia, accessed at http://web.archive.org/web/20140404192604/http://en.wikipedia.org/wiki/De_Morgan's_laws, last modified on Mar. 8, 2014, pp. 1-11.
Ashraf, R.A., and Demara, R.F., "Scalable FPGA Refurbishment Using Netlist-Driven Evolutionary Algorithms," IEEE Transactions on Computers, vol. 62, No. 8, pp. 1526-1541 (2013).

(Continued)

Primary Examiner — Kaveh Abrishamkar
Assistant Examiner — Ayoub Alata
(74) Attorney, Agent, or Firm — Turk IP Law, LLC (57) ABSTRACT Technologies are provided to automatically vary a structure of a netlist computation arranged to configure a field programmable gate array (FPGA). In an example scenario, an FPGA netlist may be received from a client to configure the FPGA. A perturbation generator may be activated in response to a detection of one or more security risk factors associated with the netlist. The netlist may be altered through schemes designed to repair one or more FPGAs. The repair schemes may be used to repair the FPGAs to work around failed cells and failed sub-cells. The perturbation generator may produce a false map of failed cells. The false map may be used to generate different timings and different intermediate values associated with the netlist to generate an alternate netlist. The alternate netlist may be used to configure the FPGA to prevent side channel attacks.

19 Claims, 7 Drawing Sheets (56) References Cited

OTHER PUBLICATIONS

Chakraborty, D., et al., "Efficient Hardware Implementations of BRW Polynomials and Tweakable Enciphering Schemes," IEEE Transactions on Computers, vol. 62, No. 2, pp. 279-294 (2013).

Cheng, L., et al., "FPGA Performance Optimization via Chipwise Placement Considering Process Variations," International Conference on in Field Programmable Logic and Applications, 2006. FPL'06, pp. 1-6, (2006).

Cilio, W., et al., "Side-Channel Attack Mitigation Using Dual-Spacer Dual-Rail Delay-Insensitive Logic (D3L)," Proceedings of the IEEE SoutheastCon 2010, pp. 471-474 (2010).

Eddy, N., "Cloud Computing Growth Hampered by Cost, Security Concerns: Survey," accessed at http://www.eweek.com/c/a/Midmarket/Cloud-Computing-Growth-Hampered-by-Cost-Security-Concerns-Survey-482398/, Jul. 22, 2011, pp. 1-5.

Garvie, M., and Thompson, A., "Scrubbing away transients and Jiggling around the permanent: Long Survival of FPGA Systems through evolutionary self-repair," Proceedings 10th IEEE International On-Line Testing Symposium, pp. 155-160 (2004).

Kong, J., et al., "Architecting Against Software Cache-Based Side-Channel Attacks," IEEE Transactions on Computers, vol. 62, No. 7, pp. 1276-1288 (2013).

Masoumi, M., et al., "Design and evaluation of basic standard encryption algorithm modules using nanosized complementary metal-oxide-semiconductor-molecular circuits," Nanotechnology, vol. 17, No. 1, pp. 89-99 (2006).

McMillan, R., "Researchers find a new way to attack the cloud," accessed at http://www.computerworld.com/s/article/9137507/Researchers_find_a_new_way_to_attack_the_cloud?taxonomyId=172&pageNumber=2, Sep. 3, 2009, pp. 1-3.

Mokari, A., et al., "SCAR-FPGA : A novel side-channel attack resistant fpga," SPL. 5th Southern Conference on Programmable Logic, 2009, pp. 177-182 (2009).

Percival, C., "Cache missing for fun and profit," Presented at BSDCan pp. 1-13 (May 2005).

Sedcole, P., and Cheung, P.Y.K., "Parametric Yield in FPGAs Due to Within-die Delay Variations: a Quantitative Analysis," in Proceedings of the 2007 ACM/SIGDA 15th International Symposium on Field Programmable Gate Arrays, pp. 178-187 (2007).

Sedcole, P., and Cheung, P.Y.K., "Within-die Delay Variability in 90nm FPGAs and Beyond," IEEE International Conference on in Field Programmable Technology, 2006, FPT 2006, pp. 97-104 (2006).

Srinivasan, S., and, Narayanan, V., "Variation Aware Placement for FPGAs," IEEE Computer Society Annual Symposium on in Emerging VLSI Technologies and Architectures, 2006, pp. 2 (2006).

Stott, A., et al., "Degradation in FPGAs: Measurement and Modelling," Proceedings 18th Annual ACM/SIGDA International Symposium Field Programmable Gate Arrays, pp. 229-238 (2010).

Tromer, E., et al., "Efficient cache attacks on AES, and countermeasures," Journal of Cryptology, pp. 35, International Association for Cryptologic Research (2009).

Zhou, M., et al., "Security and Privacy in Cloud Computing: A Survey," 2010 Sixth International Conference on Semantics Knowledge and Grid (SKG), pp. 105-112, IEEE (2010).

PERTURBATION OF FIELD PROGRAMMABLE GATE ARRAY CODE TO PREVENT SIDE CHANNEL ATTACK

BACKGROUND

Unless otherwise indicated herein, the materials described in this section are not prior art to the claims in the application and are not admitted to be prior art by inclusion in this section.

Cloud-based infrastructures may provide clients and organizations with access to computational resources that are unavailable to consumers locally. Cloud computing providers may multiplex virtual machines allocated to customers on one or more physical machines in order to ensure efficient use of physical resources. However, security may be a substantial concern for customers who deploy applications to cloud-based infrastructures. In particular, cloud-based infrastructures may be vulnerable to side channel timing attacks that utilize timers to gather information from processes that execute in the cloud-based infrastructures.

SUMMARY

The present disclosure generally describes methods, apparatus, systems, devices, and/or computer program products related to perturbation of field programmable gate array (FPGA) code to prevent a side channel attack at a datacenter.

According to some examples, methods to perturb field programmable gate array (FPGA) code to prevent a side channel attack are described. An example method may include receiving a set of circuit design instructions associated with an FPGA processor, analyzing security factors associated with the set of circuit design instructions to determine whether one or more security risk factors associated with the set of circuit design instructions are present, and in response to a confirmation that the security risk factors are present, executing a perturbation of the set of circuit design instructions.

According to other examples, datacenters configured to perturb field programmable gate array (FPGA) code to prevent a side channel attack are described. An example datacenter may include a FPGA processor communicatively coupled to a memory configured to store instructions and a server communicatively coupled to the FPGA processor. An example server may be configured to receive an FPGA netlist associated with the FPGA processor; analyze security factors associated with the FPGA netlist to determine whether one or more security risk factors associated with the FPGA netlist are present; and/or in response to that the security risk factors are present, execute the perturbation of the FPGA netlist.

According to some examples, systems may be described. An example system may include a server configured to perturb field programmable gate array (FPGA) code to prevent a side channel attack. The server of the example system may include a memory configured to store instructions and a processor coupled to the memory. The processor of the example system may be configured to receive an FPGA netlist associated with a FPGA processor of the server; analyze security factors associated with the FPGA netlist to determine whether one or more security risk factors associated with the FPGA netlist are present; and/or in response to confirming that the security risk factors are present, execute the perturbation of the FPGA netlist.

According to further embodiments, computer-readable storage mediums with instructions stored thereon to prevent a side channel attack is described. An example computer-readable storage medium, which when executed on one or more computing devices, executes a method to perturb field programmable gate array (FPGA) code to prevent a side channel attack. An example method may include the actions described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

The disclosure is generally drawn, inter alia, to methods, apparatus, systems, devices, and/or computer program products related to perturbation of a field programmable gate array code to prevent a side channel attack at a datacenter.

Briefly stated, technologies are provided to automatically vary a structure of a netlist computation arranged to configure a field programmable gate array (FPGA). In an example scenario, an FPGA netlist may be received from a client to configure the FPGA. A perturbation generator may be activated in response to a detection of one or more security risk factors associated with the netlist. The netlist may be altered through schemes designed to repair one or more FPGAs. The repair schemes may be used to repair the FPGAs to work around failed cells and failed sub-cells. The perturbation generator may produce a false map of failed cells. The false map may be used to generate different timings and different intermediate values associated with the netlist to generate an alternate netlist. The alternate netlist may be used to configure the FPGA to prevent side channel attacks.

A side channel attack, as used herein, involves an attack that exploits data-dependent behavioral characteristics of an implementation of a computation. Logical operations in a computer may be executed within a time period that varies based on an input. An attacker may work backwards to uncover the input with precise measurements of the time period. An attacker may assess relevancy of the measurements based on attributes of a cryptosystem design. Attributes of the cryptosystem design may include a central processing unit (CPU) that is configured to execute an operating system, one or more computations used by the datacenter, electromagnetic leaks, assorted implementation details, timing attack countermeasures, an accuracy of the measurements, among others. A side channel timing attack may be directed to the computation of the datacenter that has data-dependent variation of timing.

An FPGA, as used herein, may be an individual device communicatively coupled to a computer or controller that is configured to manage the FPGA's programming and/or operations. An FPGA may also be one of multiple FPGAs used as accelerators in a datacenter. A datacenter, as used herein, may refer to an entity that hosts services and applications for customers through a physical server installations and a virtual machine executed in those server installations. Clients of the datacenter, also referred to as tenants, may be organizations that provide access to their services by multiple customers. An example datacenter based service configuration may include an online retail service that provides retail sale services to clients. The retail service may employ multiple applications (e.g., presentation of retail goods, purchase management, shipping management, inventory management, etc.), which may be hosted by the datacenters. Tenants may execute applications or modules on virtual machines assigned to them (dedicated or shared). In some scenarios, some applications or modules may also be programmed into FPGAs that are part of the datacenter.

Figure 1:
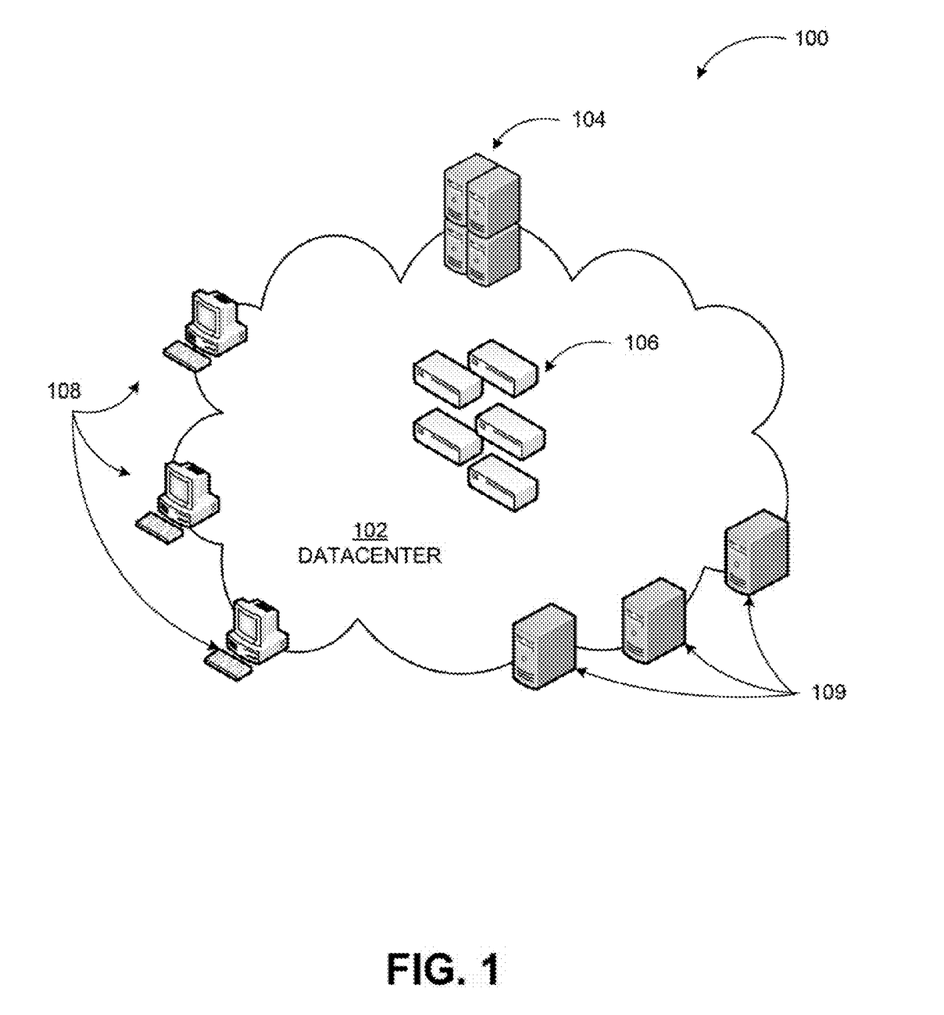
FIG. 1 illustrates an example high level diagram of a system configured to perturb field programmable gate (FPGA) code to prevent a side channel attack at a datacenter.

FIG. 1 illustrates an example high level diagram of a system configured to perturb field programmable gate (FPGA) code to prevent a side channel attack at a datacenter, arranged in accordance with at least some embodiments described herein.

As shown in a diagram 100, a datacenter 102 may be configured to perturb the FPGA code to prevent a side channel attack. The datacenter 102 may include multiple components. For example, as depicted, the components may include a server cluster 104, storage devices 106, client devices 108, and servers 109. The storage devices 106 may include devices dedicated to storage of data. Such devices may include hard disk drive (HDD) based devices, solid state drive (SSD) based devices, devices hosting SSD and HDD combinations, controllers, managers, and other storage technology based devices. The servers 109 may provide applications and services to access the data stored by the storage devices 106.

The server cluster 104 may be used to provide resource-intensive services, such as data mining and similar ones, associated with the data stored in the storage devices 106. The client devices 108 may be allowed access to data, services, and applications offered by the datacenter 102. In some examples, the server cluster 104 may be used to provide other applications and services based on configuration of the server cluster 104. A service may include an application executed or being executed at a remote device, which may provide functionality using the service through a network access to the client devices 108.

According to some embodiments, cloud computing providers may allow the client devices 108 to execute virtual machines on the server cluster 104. The virtual machines may be vulnerable to one or more side channel attacks.

According to other embodiments, communication within the datacenter 102 may be transmitted over secure channels, such as restricted access private networks. However, communication within the datacenter 102 may also be transmitted over unsecure channels. Multiple channels may be used for communication between the client devices 108, where some of the utilized channels may be secure and other channels may be unsecure. In some scenarios, communications may be managed/facilitated centrally by the servers 109. In cases where the communication is over unsecure channels, communicating parties may attempt to secure any exchange through encryption.

One drawback to encryption of a communication may include additional cost of encryption on computing resources. The cost of encryption may be mitigated through an FPGA configured to provide encryption within the datacenter 102. However, the FPGA may be vulnerable to a side channel timing attack. The FPGA may have hardwired RAM that is accessible by co-resident processes. The side channel attacks may use timers to collect information from processing times of the co-resident processes. For example, an elapsed time for key hashing may be used to determine properties of a key used in encryption. The elapsed time may be extracted through repeated evaluations of whether shared memory has been overwritten. In an example scenario, according to embodiments, the FPGA may be configured to return less predictable timings to prevent a side channel detection and a side channel timing attack.

Figure 2:
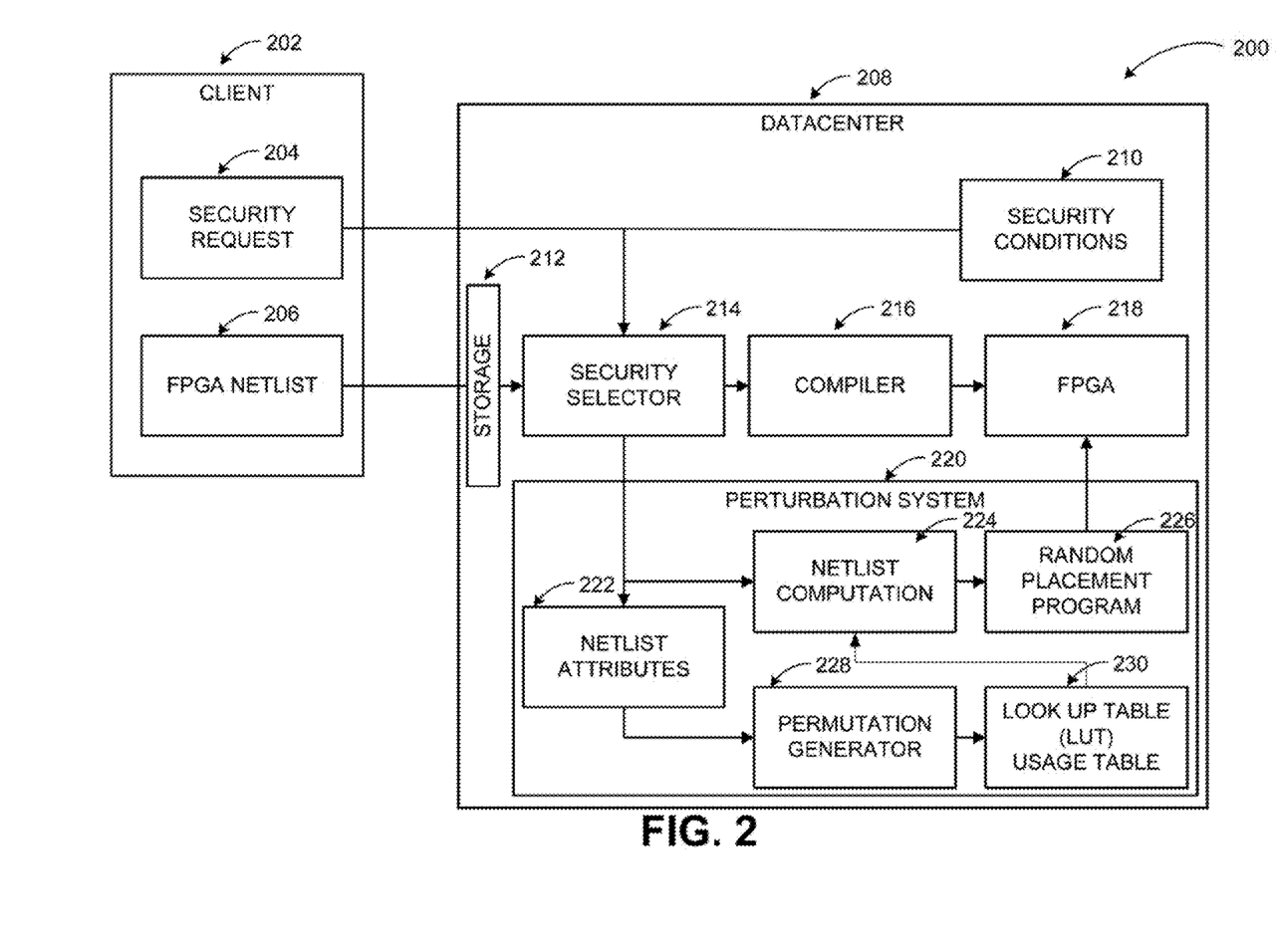
FIG. 2 illustrates an example component diagram of a datacenter configured to perturb FPGA code to prevent a side channel attack.

FIG. 2 illustrates an example component diagram of a datacenter configured to perturb FPGA code to prevent a side channel attack, arranged in accordance with at least some embodiments described herein.

As shown in a diagram 200, a client 202 may submit a FPGA netlist 206 to process in a datacenter 208. The FPGA netlist 206 may include a set of circuit design instructions arranged to configure an FPGA 218.

The datacenter 208 may receive the FPGA netlist 206. The FPGA netlist 206 may include netlist attributes 222. The netlist attributes 222 may include defensive details and circuit design instructions associated with the FPGA 218, among others. In addition, the datacenter 208 may store the FPGA netlist 206 in a storage 212.

According to some embodiments, the FPGA netlist 206 may be transmitted to a security selector 214 of the datacenter 208. The security selector 214 may analyze security conditions 210 associated with the FPGA netlist 206 to determine whether one or more security risk factors associated with the FPGA netlist 206 are present. Examples of the security conditions 210 may include an identity of the co-located clients, types of instances on shared hardware, attacks on a hypervisor through a host operating system, attacks on a hypervisor through a guest operating system, a virtual library check-out, a migration attack, an encryption attack, among others.

A perturbation system 220 may configure the FPGA 218 based on an evaluation of security risk factors present in the security conditions 210. Alternatively or additionally, the perturbation system 220 may configure the FPGA 218 based on a security request 204 from the client 202. The security request 204 may include a message to configure the FPGA 218 to resist one or more side channel attacks.

The FPGA 218 may include arrays of logic blocks, interconnection resources, and other components. The array of logic blocks may be used for digital logic implementation. The interconnection resources may be used for connecting the logic blocks. The array of logic blocks may include a k-input look up table (LUT) usage table 230 and a flip-flop (FF). The FF may be a basic element of the storage 212 in a sequential logic. The FF may include a circuit that has two stable states. The circuit may be used to store state information. The FF may change a state by signals applied to control inputs. In some embodiments, the FPGA 218 may include the arrays of logic blocks in conjunction with input/output (I/O) blocks and fixed function blocks. The function blocks may be configured to provide common functions, including memory, I/O, signal processing, among others.

According to some embodiments, the FPGA 218 may be configured to provide interconnected arrangements of combinatorial logic circuits that are configured to execute an application. The combinatorial logic circuits may include logic tabulated in the LUT usage table 230 and other modules linked along interconnection paths. The interconnection paths between different parts of the FPGA 218 may introduce delays to an execution path of an application. The delays may result from the interconnection paths that pass through a variable number of switch boxes. Execution of the application through the interconnection paths between different parts of the FPGA 218 may change timing of combinatorial sub-components.

According to some embodiments, the security selection 214 may evaluate security factors associated with the FPGA netlist 206. The security selector 214 may determine whether one or more security risk factors associated with the FPGA netlist are present. In response to a negative determination, the security selector 214 may transmit the FPGA netlist 206 to a compiler 216. The compiler 216 may process the FPGA netlist 206 through a compilation and programming module to configure the FPGA 218.

In response to an affirmative determination, the FPGA netlist 206 may be transmitted to a netlist computation 224. The netlist computation 224 of the perturbation system 220 may perform the perturbation on the FPGA netlist 206. The netlist attributes 222, which include circuit design instructions of the FPGA 218, may be processed by the netlist computation 224. The netlist computation 224 may be an evolutionary computation based on a netlist-driven evolutionary refurbishment computation, which may be altered through a permutation generator 228.

The permutation generator 228 may be used to determine the LUT usage table 230 of the FPGA 218 as a defective unit based on a characterization of the FPGA netlist 206. The LUT usage table 230 may include a logic associated with an application configured to execute in the FPGA 218. The randomized grid of the LUT usage table 230 may have portions falsely reported as unavailable at an available location of the FPGA 218.

According to some embodiments, the datacenter 208 may alter a time associated with an execution of an application through a delay caused by a new location of the logic. The datacenter 208 may apply one or more of unavailable LUT usage tables, geometric constraints, logic constraints, and similar ones as the netlist attributes 222 to the circuit design instructions of the FPGA netlist 206. The netlist attributes 222 may be added to the FPGA netlist 206 to generate a modified combinatorial logic and a modified arrangement associated with the netlist attributes 222.

The modified combinatorial logic may be fed into a random placement program 226 that may randomize the timing of the combinatorial sub-components during a final compilation by altering placement locations of modules. In some embodiments, the architecture of the FPGA 218 may be edited by changing data orders and locations in permutations. The locations in the permutations may be random. Altered permutations may obscure side channel attackers' attempt to extract information from the FPGA 218.

Figure 3:
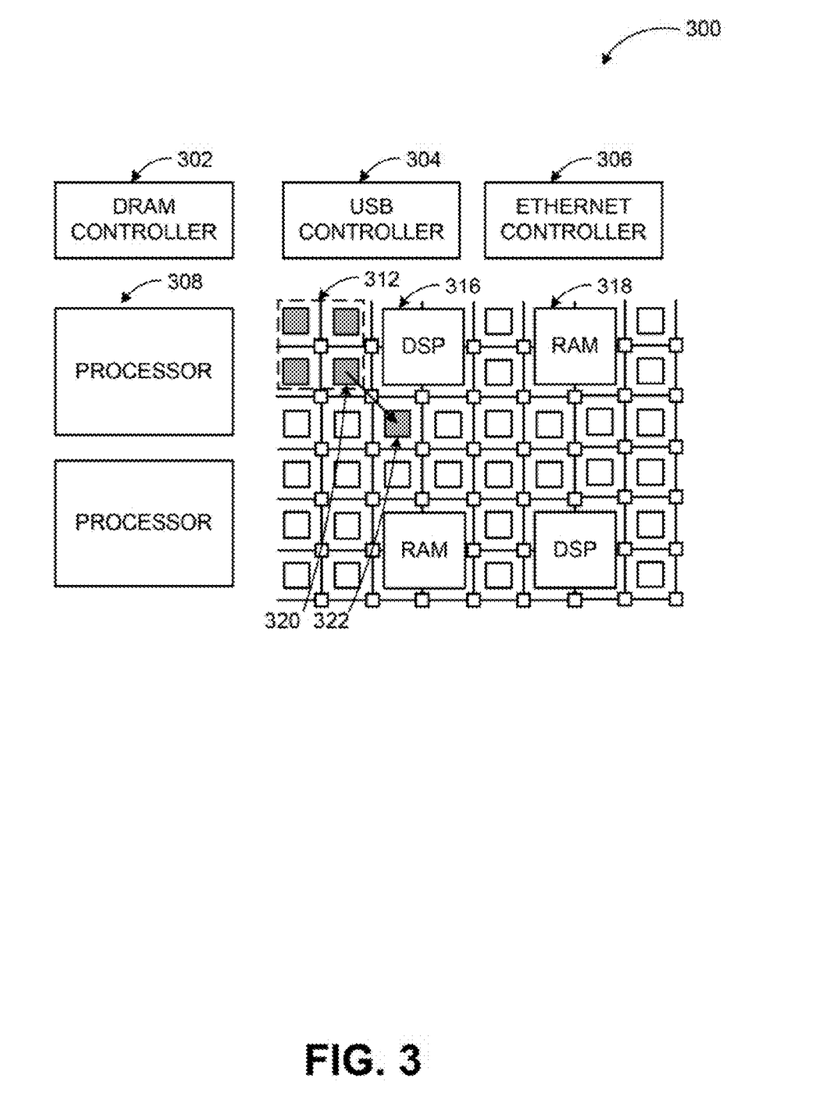
FIG. 3 illustrates an example diagram of a FPGA of a datacenter perturbed to prevent a side channel attack.

FIG. 3 illustrates an example diagram of a FPGA of a datacenter perturbed to prevent a side channel attack, arranged in accordance with at least some embodiments described herein.

As shown in FIG. 3, a diagram 300 may represent an FPGA of a datacenter. The FPGA may include non-field-programmable gates and hardwired elements. The hardwired elements may include a digital signal processor (DSP) 316, RAM 318, communication controllers, among others. The communication controllers may be coupled to memory, a processor 308, among others. The communication controllers may include a DRAM controller 302, a USB controller 304, an Ethernet controller 306, among others.

DRAM may include a type of random-access memory that stores bits of data in a separate capacitor within an integrated circuit. The DRAM controller 302 may manage dynamic memory and volatile memory. The DRAM controller 302 may include refresh logic that automates a periodic refresh of memory. Examples of DRAM may include double data rate synchronous dynamic random-access memory (DDR SDRAM), static random-access memory (SRAM), among others. The USB controller 304 and the Ethernet controller 306 may be replaced by a gigabit Ethernet (GigE), a controller area network (CAN) bus, an inter-integrated circuit (I$^2$C) bus, a universal asynchronous receiver/transmitter (UART), a general-purpose input/output (GPIO), among others.

According to some embodiments, the datacenter may receive an FPGA netlist from a client. Security factors associated with the FPGA netlist may be analyzed to determine whether one or more security risk factors associated with the FPGA netlist are present. In response to a confirmation, the perturbation of the FPGA netlist may be executed to configure the FPGA.

A look up table (LUT) of the FPGA may be indicated as a defective unit based on an evaluation of netlist attributes of the FPGA netlist. The LUT may be cell or sub-cell of the FPGA. The LUT may manage a logic associated with an application 312 configured to execute in the processor 308. The application 312 may include logic distributed across one or more LUTs. A permutation generator may process the netlist attributes to determine a first look up table (LUT) 320 of the application 312 as a simulated defect. The logic of the application 312 within the first LUT 320, that has the simulated defect, may be moved to a second LUT 322 by the netlist computation. Delays in reaching the second LUT 322 may impact other applications or computations that make use of combinatorial logic route that includes the first LUT 320. The delays may introduce time changes to the computations or applications that include the combinatorial logic route. The time changes may prevent side channel timing attacks.

According to some embodiments, a permutation generator may be used to generate a simulated set of failed LUTs. The permutation generator may produce a perturbation map based on the netlist attributes of the datacenter. The permutation generator may map the failed LUTs into a LUT usage table to force a repair reconfiguration in the application 312. The permutation generator may provide reconfigurations suitable to the prevention of the side channel attacks. In an example scenario, a permutation from the permutation generator for the application 312 may take half of the FPGA space. The permutation may indicate some of the LUTs as failed, randomly. The result of this action may include modifications to logic, layout, timing, and similar attributes of applications that are configured to execute on the FPGA. The datacenter may prevent side channel attacks through continuous and randomized timing and logic of applications with one or more changes provided by the permutations that are generated and recompiled on a schedule (e.g., once per day).

Figure 4:
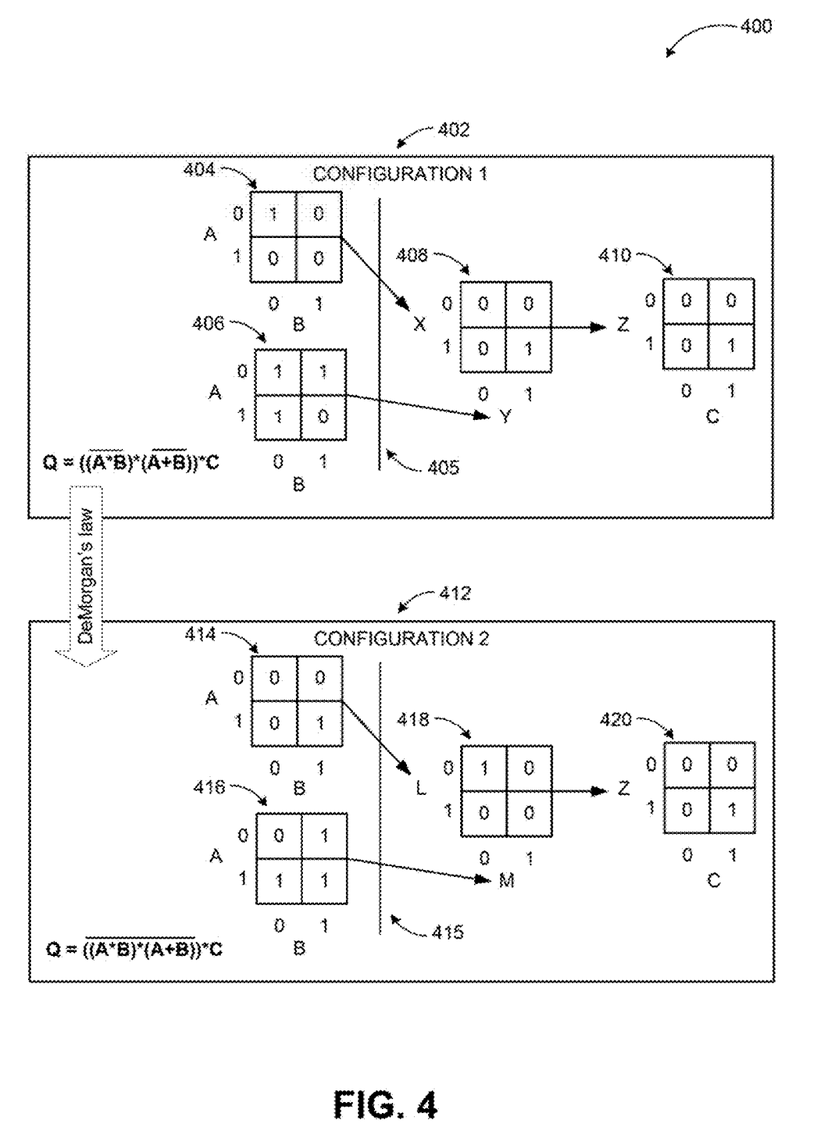
FIG. 4 illustrates an example configuration that implements changes to FPGA code to prevent a side channel attack at a datacenter.

FIG. 4 illustrates an example configuration that implements changes to FPGA implementation to prevent a side channel attack at a datacenter, arranged in accordance with at least some embodiments described herein.

As shown in a diagram 400, example logic permutations may be delivered by a datacenter in a presence of faulted look up table (LUT) sub-cells. A function Q and its truth table 410 are shown in configuration 1 (402). The "memory boundary" 405 may be a boundary between sequential logic regions and these may be considered as values stored in memory during computation. The intermediate values in configuration 1, (X, Y) 408, are different than in configuration 2 (412), (L, M) 418 beyond the memory boundary 415 even though the final computation may be the same, such that if these were values or pointers used in a more complex operation they may defeat various value reading side channel attacks like power channel attacks. Changes in placement and changes in the later computation time of different intermediate outputs may both contribute to randomized timing. Configuration 1 (402) and configuration 2 (412) may produce the same output Q from the same inputs A, B, and C (tables 404, 406 and 414, 416, respectively).

In the example scenario, the transformation is performed by De Morgan's law, which may also be applied on larger modular portions of bigger circuits to result in large scale rearrangements of modules. De Morgan's law changes do not cause rearrangement, but they cause changes in intermediate values to obscure the meaning of intermediate values stored in vulnerable memory.

De Morgan's law is a logic theorem for digital electronics. De Morgan's law may describe that any logical binary expression may remain unchanged if the operands are changed to their complements (e.g., the AND operations may be changed to OR operations and the OR operations may be changed to AND operations) and the complement is taken from the expression. Example applications of De Morgan's law may include negated AND (NAND) gate combinations, NOR gate combinations, exclusive disjunction (XOR) gate with NANDs, negative logic gates, among others.

The truth tables in diagram 400 present possible values for variables A, B, X, Y (L, M in configuration 2), and C, Z. Each row or column of the truth tables may include one possible configuration of the variables (e.g., A=true=1, B=false=0).

In some embodiments, the transformation may be applied on larger modular portions of larger circuits that result in large scale rearrangements of modules. Through the use of De Morgan's law or comparable transformations, intermediate values may be changed to obscure the meaning of the intermediate values stored in vulnerable memory while the final results do not change. Thus, value reading side channel attacks (e.g., power channel attacks) may be prevented from identifying FPGA configurations.

The examples in FIGS. 1 through 4 have been described using specific systems and processes in which perturbation of FPGA code to prevent a side channel attack at a datacenter may be implemented. Embodiments for perturbation of FPGA code to prevent a side channel attack at a datacenter are not limited to the systems and processes according to these examples.

Figure 5:
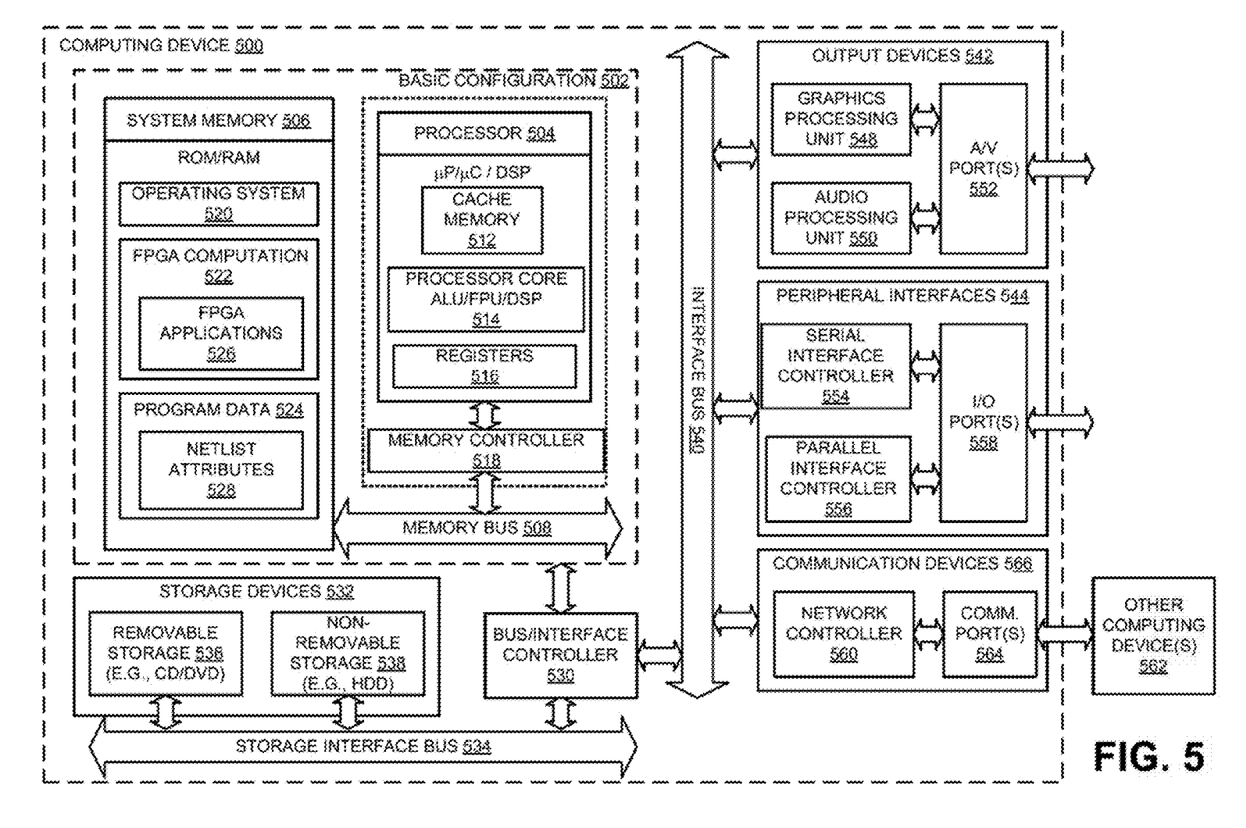
FIG. 5 illustrates a general purpose computing device, which may be used to perturb FPGA code to prevent a side channel attack at a datacenter.

FIG. 5 illustrates a general purpose computing device, which may be used to perturb FPGA code to prevent a side channel attack at a datacenter, arranged in accordance with at least some embodiments described herein. A computing device 500 of the FIG. 5 may be one or more components of the datacenter (102, 208), or some other device that is not shown in FIGS. 1, 2, 3, and 4. In a very basic configuration 502, the computing device 500 may include one or more processors 504 and a system memory 506. A memory bus 508 may be used for communicating between the processor 504 and the system memory 506.

Depending on a particular configuration, the processor 504 may be of any type including but not limited to a microprocessor (µP), a microcontroller (µC), a Digital Signal Processor (DSP), or any combination thereof. The processor 504 may include one more levels of caching, such as a cache memory 512, a processor core 514, and registers 516. Example processor core 514 may include an Arithmetic Logic Unit (ALU), a floating point unit (FPU), a Digital Signal Processing core (DSP Core), or any combination thereof. An example memory controller 518 may also be used with the processor 504, or in some implementations, the memory controller 518 may be an internal part of the processor 504.

Depending on the particular configuration, the system memory 506 may be of any type including but not limited to volatile memory (such as RAM), non-volatile memory (such as ROM, flash memory, etc.), or any combination thereof. The system memory 506 may include an operating system 520, an FPGA computation 522, program data 524, FPGA applications 526, and netlist attributes 528. The FPGA computation 522 may include the FPGA applications 526, which may include interconnected arraignments of combinatorial logic circuits within a datacenter. Program data 524 may include the netlist attributes 528 and similar data as discussed above in conjunction with at least FIGS. 1, 2, 3, and 4. The netlist attributes 528 may include defensive details, such as pointer and data, and circuit design instructions associated with the FPGA processor, among others. The described basic configuration 502 is illustrated in FIG. 5 by those components within the inner dashed line.

The computing device 500 may have additional features or functionality, and additional interfaces to facilitate communications between the basic configuration 502 and any devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any technique or technology for storage of information, such as computer readable instructions, data structures, program modules, or other data.

The system memory 506, the removable storage devices 536 and the non-removable storage devices 538 may be examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 566) to the basic configuration 502 via bus/interface controller 530. Examples of the output devices 542 include a graphics processing unit 548 and an audio processing unit 550, which may be configured to communicate to various external devices such as a display or speakers via one or more A/V ports 552. Example of the peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example of the communication device 566 includes a network controller 560, which may be arranged to facilitate communications with one or more other computing devices 562 over a network communication link via one or more communication ports 564.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a physical server, virtual server, a computing cloud, or a hybrid device that include any of the above functions. The computing device 500 may also be implemented as a personal computer including both laptop computer and non-laptop computer configurations. Moreover, the computing device 500 may be implemented as a networked system or as part of a general purpose or specialized server.

Networks for a networked system including the computing device 500 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise distinct networks that may be adapted to operate together. Such networks may be configured to provide communication between the nodes described herein. By way of example, and not limitation, these networks may include wireless media such as acoustic, RF, infrared and other wireless media. Furthermore, the networks may be portions of the same network or separate networks.

Figure 6:
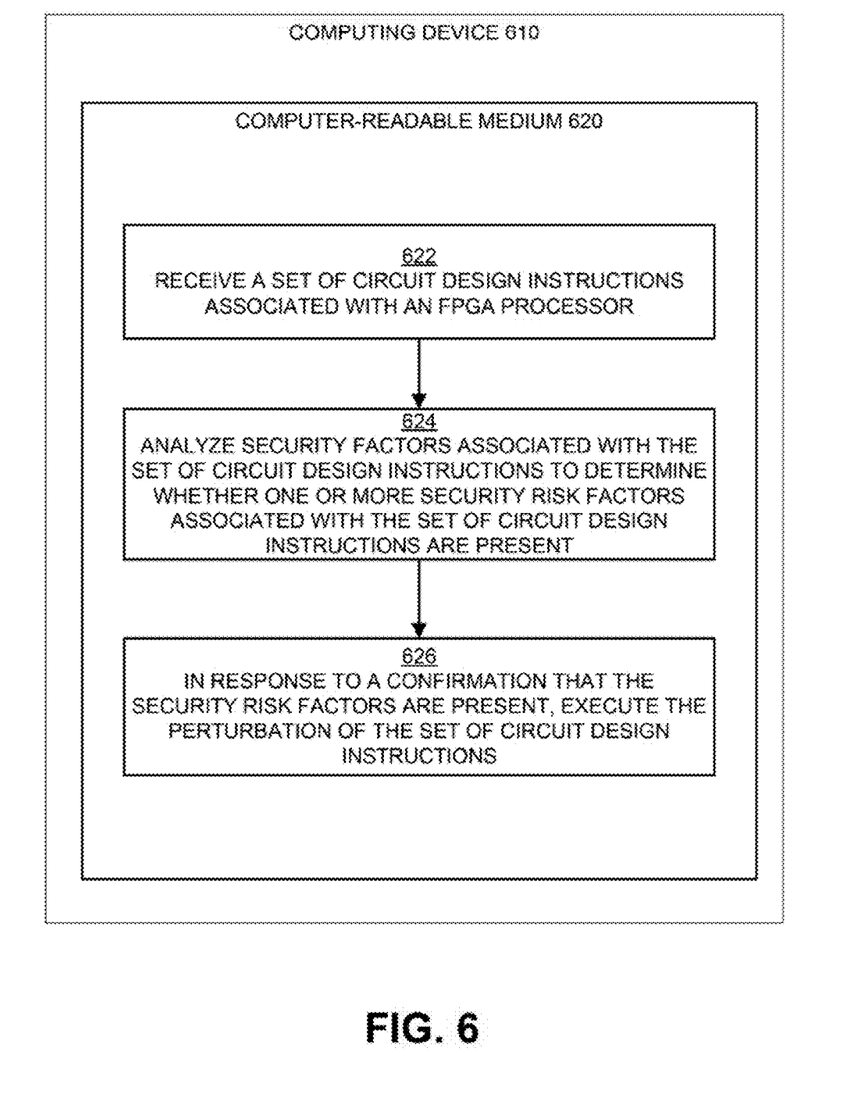
FIG. 6 is a flow diagram illustrating an example method to perturb FPGA code to prevent a side channel attack at a datacenter.

FIG. 6 is a flow diagram illustrating an example method to perturb FPGA code to prevent a side channel attack at a datacenter, which may be performed by a computing device 610, such as the computing device 500 in FIG. 5, arranged in accordance with at least some embodiments described herein.

The computing device 610 may be embodied as the computing device 500, or similar devices executing instructions stored in a non-transitory computer-readable medium 620 for performing the method. A process related to the perturbation of FPGA code to prevent a side channel attack at a datacenter may include one or more operations, functions or actions as is illustrated by one or more of blocks 622, 624, and/or 626.

Some example processes may begin with an operation 622, "RECEIVE A SET OF CIRCUIT DESIGN INSTRUCTIONS ASSOCIATED WITH AN FPGA PROCESSOR." The set of circuit design instructions may be included within the netlist attributes 222. The circuit design instructions may include defensive details, such as pointer and data, among others. The processor 308 may also receive a characterization of the FPGA netlist 206.

The operation 622 may be followed by an operation 624, "ANALYZE SECURITY FACTORS ASSOCIATED WITH THE SET OF CIRCUIT DESIGN INSTRUCTIONS TO DETERMINE WHETHER ONE OR MORE SECURITY RISK FACTORS ASSOCIATED WITH THE SET OF CIRCUIT DESIGN INSTRUCTIONS ARE PRESENT." The security factors associated with the FPGA netlist 206 (e.g., the set of circuit design instructions) may be analyzed against the security conditions 210. The security conditions 210 may include an identity of the co-located clients, types of instances on shared hardware, attacks on a hypervisor through a host operating system, attacks on a hypervisor through a guest operating system, a virtual library check-out, a migration attack, an encryption attack, among others.

The operation 624 may be followed by an operation 626, "IN RESPONSE TO A CONFIRMATION THAT THE SECURITY RISK FACTORS ARE PRESENT, EXECUTE THE PERTURBATION OF THE SET OF CIRCUIT DESIGN INSTRUCTIONS," where the processor 308 may determine locations of variables in memory of the FPGA through the FPGA netlist 206. The variables may be associated with applications configured to execute on the FPGA. The variables may be determined to be configured for protection through the perturbation. The processor 308 may move the variables to other locations in the memory based on the perturbation and may reconfigure the variables based on the perturbation. The processor 308 may process FPGA netlist 206 through the netlist computation 224. The processor 308 may additionally generate a grid of look up table (LUT) usage tables 230 of the FPGA. The grid may be reported as unavailable at the available LUT usage table 230 of the FPGA.

The blocks included in the above described process are for illustration purposes. Employing products related to perturbation of FPGA code to prevent a side channel attack at a datacenter may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
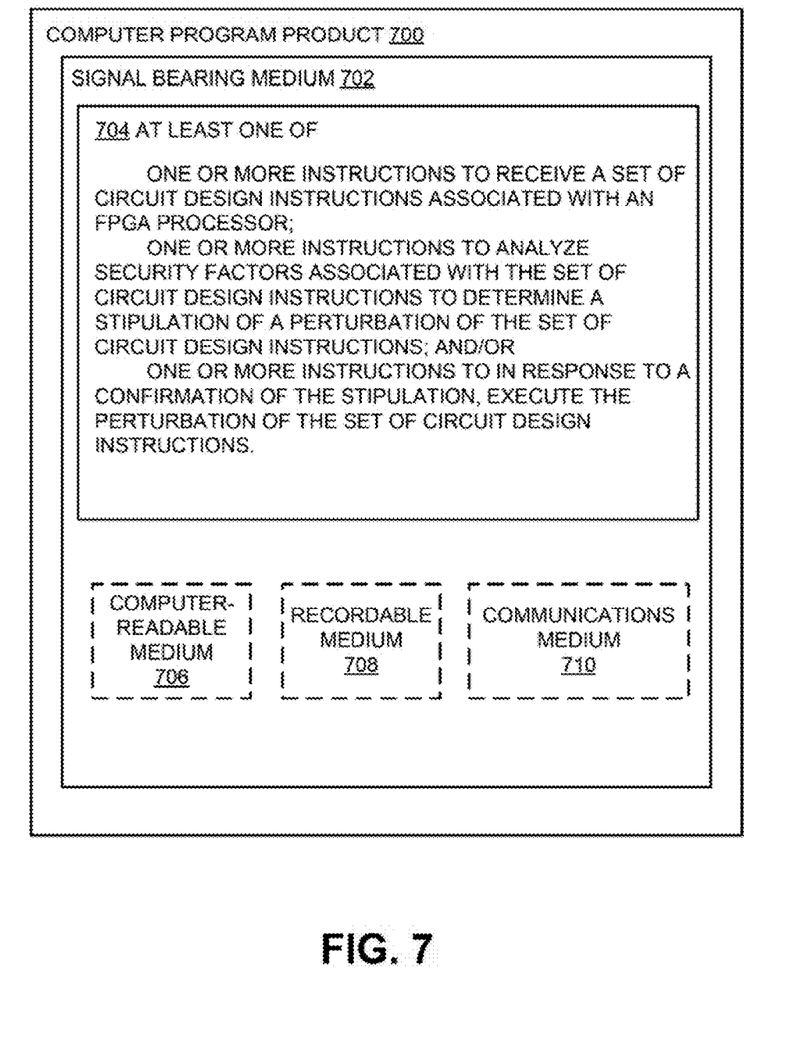
FIG. 7 illustrates a block diagram of an example computer program product to perturb FPGA code to prevent a side channel attack at a datacenter, all arranged in accordance with at least some embodiments described herein.

FIG. 7 illustrates a block diagram of an example computer program product to perturb FPGA code to prevent a side channel attack at a datacenter, arranged in accordance with at least some embodiments described herein.

In some examples as shown in FIG. 7, a computer program product 700 may include a signal bearing medium 702 that may also include machine readable instructions 704 that, in response to execution by, for example, a processor, may provide the functionality described above with respect to FIG. 1 through FIG. 6. For example, referring to the computing device 500, one or more of the tasks shown in FIG. 7 may be undertaken in response to the instructions 704 conveyed to the computing device 500 by the signal bearing medium 702 to perform actions associated with the perturbation of FPGA code to prevent a side channel attack at a datacenter. Some of those instructions may include: receiving a set of circuit design instructions associated with an FPGA processor, analyzing security factors associated with the set of circuit design instructions to determine whether one or more security risk factors associated with the set of circuit design instructions are present, in response to a confirmation that the security risk factors are present, executing a perturbation of the set of circuit design instructions, among others.

In some implementations, signal bearing medium 702 depicted in FIG. 7 may encompass a non-transitory computer-readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). For example, computer program product 700 may be conveyed to the processor 504 in FIG. 5 by an RF signal bearing medium 702, where the signal bearing medium 702 is conveyed by a wireless communications medium 710 (e.g., a wireless communications medium conforming with the IEEE 802.11 standard).

According to other examples, analyzing the security factors may include assessing the set of circuit design instructions against datacenter security conditions. The datacenter security conditions may include one or more of identity of co-located clients, types of instances on shared hardware, and a security request. Executing the perturbation may include processing the set of circuit design instructions through an evolutionary computation. The set of circuit design instructions may include an FPGA netlist.

According to further examples, the method may also include generating a randomized grid of look up table (LUT) devices of the FPGA processor. The method may further include reporting the randomized grid as unavailable at an available LUT table of the FPGA processor. The method may also include receiving a characterization of the set of circuit design instructions and determining locations of variables in a memory of the FPGA processor through the set of circuit design instructions, where the variables are associated with executing applications in the FPGA processor and the variables are determined for protection through the perturbation.

According to yet other examples, the method may include moving each of the variables to other locations in the memory based on the perturbation and reconfiguring each of the variables based on the perturbation. The method may further include determining eliminated look up tables (LUTs), geometric constraints, and logic constraints based on the perturbation, and applying one or more of the eliminated LUTs, the geometric constraints, and the logic constraints to the set of circuit design instructions to generate a modified combinatorial logic and a modified arrangement associated with variables, where the variables are associated with applications executing in the FPGA processor and the variables are stored in a memory of the FPGA processor. The method may also include providing the modified combinatorial logic and the modified arrangement to a randomization computation to randomize timings associated with the applications by altering locations of modules associated with the applications in the memory.

According to other examples, datacenters configured to perturb field programmable gate array (FPGA) code to prevent a side channel attack are described. An example datacenter may include a FPGA processor communicatively coupled to a memory configured to store instructions and a server communicatively coupled to the FPGA processor. An example server may be configured to receive an FPGA netlist associated with the FPGA processor; analyze security factors associated with the FPGA netlist to determine whether one or more security risk factors associated with the FPGA netlist are present; and/or in response to that the security risk factors are present, execute the perturbation of the FPGA netlist.

According to some examples, the server may determine a look up table (LUT) device of the FPGA processor as a defective unit based on a characterization of the FPGA netlist, where the LUT device manages a logic associated with an application executing in the FPGA processor. The server may also move the logic to a new location within another LUT device based on the perturbation. The server may further alter a time associated with executing the application through a delay caused by the new location of the logic.

According to further examples, the server may receive another FPGA netlist overlapping the LUT device of the FPGA netlist and share the LUT device between the FPGA netlist and the other FPGA netlist to minimize a penalty associated with forgoing the LUT device through a determination of the LUT device as the defective unit.

According to some examples, systems may be described. An example system may include a server configured to perturb field programmable gate array (FPGA) code to prevent a side channel attack. The server of the example system may include a memory configured to store instructions and a processor coupled to the memory. The processor of the example system may be configured to receive an FPGA netlist associated with a FPGA processor of the server; analyze security factors associated with the FPGA netlist to determine whether one or more security risk factors associated with the FPGA netlist are present; and/or in response to confirming that the security risk factors are present, execute the perturbation of the FPGA netlist.

According to other examples, the processor may modify a first logic of a first look up table (LUT) device with a NOT operation and modify a second logic of a second LUT device with another NOT operation. The processor may also apply a De Morgan's Law operation to the first logic and the second logic to generate a resulting logic, where the resulting logic produces an execution pathway substantially equal to another execution pathway associated with the first logic prior to the NOT operation and the second logic prior to the other NOT operation.

According to yet other examples, the instructions may further cause the processor to assess the FPGA netlist against datacenter security conditions, where the datacenter security conditions include one or more of identity of co-located clients, types of instances on shared hardware, and a security request by the client. The instructions may also cause the processor to process the FPGA netlist through an evolutionary computation. The instructions may further cause the processor to generate a randomized grid of look up table (LUT)

devices of the FPGA processor and report the randomized grid as unavailable at an available LUT table of the FPGA processor.

According to further examples, the instructions may further cause the processor to receive a characterization of the FPGA netlist; determine locations of variables in memory of the FPGA processor through the FPGA netlist, where the variables are associated with executing applications in the FPGA processor and the variables are determined for protection through the perturbation; move each of the variables to other locations in the memory based on the perturbation; and reconfigure each of the variables based on the perturbation.

According to other examples, the instructions may further cause the processor to determine eliminated look up tables (LUTs), geometric constraints, and logic constraints based on the perturbation; apply one or more of the eliminated LUTs, the geometric constraints, and the logic constraints to the FPGA netlist to generate a modified combinatorial logic and a modified arrangement associated with variables, where the variables are associated with applications executing in the FPGA processor and the variables are stored in a memory of the FPGA; and provide the modified combinatorial logic and the modified arrangement to a randomization computation to randomize timings associated with the applications by altering locations of modules associated with the applications in the memory.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of the disclosure.

The present disclosure is not to be limited in terms of the particular embodiments described in the application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those generally found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to perturb field programmable gate array (FPGA) code to prevent a side channel attack, the method comprising: receiving a set of circuit design instructions associated with an FPGA processor; analyzing security factors associated with the set of circuit design instructions to determine whether one or more security risk factors associated with the set of circuit design instructions are present; and in response to a confirmation that the one or more security risk factors are present, executing a perturbation of the set of circuit design instructions; determining eliminated look UP tables (LUTs), geometric constraints, and logic constraints based on the perturbation; and applying one or more of the eliminated LUTs, the geometric constraints, and the logic constraints to the set of circuit design instructions to generate a modified combinatorial logic and a modified arrangement associated with variables, wherein the variables are associated with applications executing in the FPGA processor and the variables are stored in a memory of the FPGA processor.

2. The method of claim 1, wherein analyzing the security factors comprises: assessing the set of circuit design instructions against datacenter security conditions.

3. The method of claim 2, wherein the datacenter security conditions include one or more of identity of co-located clients, types of instances on shared hardware, and a security request.

4. The method of claim 1, wherein executing the perturbation comprises: processing the set of circuit design instructions through an evolutionary computation.

5. The method of claim 1, wherein the set of circuit design instructions are an FPGA netlist.

6. The method of claim 1, further comprising: generating a randomized grid of look up table (LUT) devices of the FPGA processor.

7. The method of claim 6, further comprising: reporting the randomized grid as unavailable at an available LUT table of the FPGA processor.

8. The method of claim 1, further comprising: receiving a characterization of the set of circuit design instructions; and determining locations of variables in a memory of the FPGA processor through the set of circuit design instructions, wherein the variables are associated with executing applications in the FPGA processor and the variables are determined for protection through the perturbation.

9. The method of claim 8, further comprising: moving each of the variables to other locations in the memory based on the perturbation; and reconfiguring each of the variables based on the perturbation.

10. The method of claim 1, further comprising: providing the modified combinatorial logic and the modified arrangement to a randomization computation to randomize timings associated with the applications by altering locations of modules associated with the applications in the memory.

11. A datacenter configured to perturb field programmable gate array (FPGA) code to prevent a side channel attack, the datacenter comprising: a FPGA processor communicatively coupled to a memory configured to store instructions; a server communicatively coupled to the FPGA processor, wherein the server is configured to: receive an FPGA netlist associated with the FPGA processor; analyze security factors associated with the FPGA netlist to determine whether one or more security risk factors associated with the FPGA netlist are present; and in response to confirming that the one or more security risk factors are present, execute a perturbation of the FPGA netlist; determine eliminated look up tables (LUTs), geometric constraints, and logic constraints based on the perturbation; and apply one or more of the eliminated LUTs, the geometric constraints, and the logic constraints to the set of circuit design instructions to generate a modified combinatorial logic and a modified arrangement associated with variables, wherein the variables are associated with applications executing in the FPGA processor and the variables are stored in a memory of the FPGA processor.

12. The datacenter according to claim 11, wherein the server is further configured to: determine a look up table (LUT) device of the FPGA processor as a defective unit based on a characterization of the FPGA netlist, wherein the
LUT device manages a logic associated with an application executing in the FPGA processor.

13. The datacenter according to claim 12, wherein the server is further configured to: move the logic to a new location within another LUT device based on the perturbation.

14. The datacenter according to claim 13, wherein the server is further configured to: alter a time associated with executing the application through a delay caused by the new location of the logic.

15. The datacenter according to claim 12, wherein the server is further configured to: receive another FPGA netlist overlapping the LUT device of the FPGA netlist; and share the LUT device between the FPGA netlist and the other FPGA netlist to minimize a penalty associated with forgoing the LUT device through a determination of the LUT device as the defective unit.

16. A system comprising: a server configured to perturb field programmable gate array (FPGA) code to prevent a side channel attack, the server comprising: a processor, a memory configured to store instructions, the processor coupled to the memory, wherein the processor is configured to: receive an FPGA netlist associated with a FPGA processor of the server; analyze security factors associated with the FPGA netlist to determine whether one or more security risk factors associated with the FPGA netlist are present; and in response to confirming that the one or more security risk factors are present, execute a perturbation of the FPGA netlist; determine eliminated look up tables (LUTs), geometric constraints, and logic constraints based on the perturbation; and apply one or more of the eliminated LUTs, the geometric constraints, and the logic constraints to the set of circuit design instructions to generate a modified combinatorial logic and a modified arrangement associated with variables, wherein the variables are associated with applications executing in the FPGA processor and the variables are stored in a memory of the FPGA processor.

17. The system according to claim 16, wherein the processor is further configured to: modify a first logic of a first look up table (LUT) device with a NOT operation; and modify a second logic of a second LUT device with another NOT operation.

18. The system according to claim 17, wherein the processor is further configured to: apply a De Morgan's Law operation to the first logic and the second logic to generate a resulting logic, wherein the resulting logic produces an execution pathway equal to another execution pathway associated with the first logic prior to the NOT operation and the second logic prior to the other NOT operation.

19. The system according to claim 17, wherein the processor is further configured to: generate a randomized grid of LUT devices of the FPGA processor; and report the randomized grid as unavailable at an available LUT table of the FPGA processor.

* * * * *